United States Patent [19]

Lynn et al.

[11] Patent Number: 4,840,671

[45] Date of Patent: Jun. 20, 1989

[54] PROCESS FOR CHEMICAL STABILIZATION OF HEAVY METAL BEARING DUSTS AND SLUDGES AS EAF DUST

[75] Inventors: John D. Lynn, Center Valley; Charles E. Jablonski; Walter D. Egan, both of Bethlehem, all of Pa.

[73] Assignee: Bethlehem Steel Corporation, Bethlehem, Pa.

[21] Appl. No.: 227,438

[22] Filed: Jul. 29, 1988

Related U.S. Application Data

[63] Continuation of Ser. No. 63,605, Jun. 18, 1987, abandoned.

[51] Int. Cl.$^4$ .................. C04B 13/34; C04B 7/147; C04B 7/00
[52] U.S. Cl. ........................................ 106/85; 106/85; 106/97; 106/104; 106/118; 106/120; 210/911; 210/912
[58] Field of Search .................. 106/85, 89, 97, 104, 106/118, 120; 210/911, 912

[56] References Cited

U.S. PATENT DOCUMENTS

| | | | |
|---|---|---|---|
| Re. 29,783 | 9/1978 | Smith et al. | 210/59 |
| 3,341,341 | 9/1967 | Corson | 106/98 |
| 3,579,443 | 5/1971 | Horst | 210/912 |
| 3,634,115 | 1/1972 | Minnick | 106/85 |
| 3,720,609 | 3/1973 | Smith et al. | 210/59 |
| 3,852,084 | 12/1974 | Webster et al. | 106/118 |
| 3,960,723 | 6/1976 | Butler | 210/912 |
| 4,116,705 | 9/1978 | Chappell | 106/90 |
| 4,226,630 | 10/1980 | Styron | 106/85 |
| 4,434,060 | 2/1984 | Alrmansberger et al. | 210/912 |
| 4,518,508 | 5/1985 | Conner | 210/911 |
| 4,566,912 | 1/1986 | Borg | 210/912 |
| 4,566,975 | 1/1986 | Allgulin | 210/911 |
| 4,668,124 | 5/1987 | Pitts et al. | 501/129 |
| 4,741,776 | 5/1988 | Rye et al. | 106/89 |

Primary Examiner—William R. Dixon, Jr.
Assistant Examiner—David M. Brusman
Attorney, Agent, or Firm—Steele, Gould & Fried

[57] ABSTRACT

This invention is directed to a process for the chemical stabilization of heavy metal bearing dusts and sludges. A preferred use for such process is the treatment of dust from an electric arc furnace (EAF). In the production of steel by the electric arc furnace process, a by-product thereof is the generation of EAF dust. Such dust, by virtue of the presence of such elements as cadmium, hexavalent chromium and lead, is classified as hazardous waste by U.S. Environmental Protection Agency (EPA). The present invention is directed to a process for the chemical stabilization of the inorganic EAF dust to render the hazardous constituents thereof virtually immobile. Such process is based on the pozzolanic reaction of materials containing anhydrous alumino-silicates which, in the presence of lime, water and chemicals, adsorb and/or physically entrap the heavy metals present in EAF dust into a calcium-alumino-silicate matrix.

10 Claims, No Drawings

PROCESS FOR CHEMICAL STABILIZATION OF HEAVY METAL BEARING DUSTS AND SLUDGES AS EAF DUST

This is a continuation of application Ser. No. 063,605, filed June 18, 1987 now abandoned.

BACKGROUND OF THE INVENTION

The present invention, a process for the chemical stabilization of heavy metal dusts and sludges, has particular utility for the steel industry, where control of furnace emissions are necessary. While this invention has broad application in the stabilization of heavy metals, it will be described in detail by its preferred use or application.

The basic or dominant steelmaking practice followed today in the domestic and foreign steel industry is the basic oxygen process. Such process utilizes molten pig iron as the basic charge to the furnace, which thereafter is refined and alloyed as required. This process requires the ready availability of molten pig iron, produced by blast furnaces.

Where molten pig iron is not available, and/or for the production of certain specialty grades of steel, an electric arc furnace (EAF) process is followed. In a typical EAF process, solid charge ingredients including raw scrap, limestone, burnt lime, iron ore and ferro alloy additives, are placed in the top-charge furnace unit. A conventional furnace unit is equipped with (1) a roof lift and swing arrangement which permits the roof to swing aside when cold scrap is charged into the furnace; (2) a rocker and rail tilting type arrangement which permits the furnace to tilt forward for tapping and backward for slagging; (3) a system for additions through the furnace roof; and (4) evacuation systems for the removal of dust generated during the steelmaking cycle.

The electrodes are supported by electrode arms and clamps, and project from overhead down through the furnace roof. The electrodes are automatically controlled by an electro-mechanical positioning mechanism. An electric arc surging between the electrodes and scrap produces heat which melts the charge and refines the steel. The molten steel is tapped, typically at about 3000° F., into a ladle and cast into blooms or poured into ingot molds.

In such a process, particulate emissions are generated during (1) charging of scrap, (2) tapping of furnaces, (3) pneumatic injection of additives, (4) oxygen blowing and (5) meltdown/refining periods. This particulate, EAF dust is collected in baghouses. Even though carefully monitored landfills have been used to minimize the problems associated with EAF dust, the EPA has determined that such inorganic dust constitutes a hazardous waste. More specifically, EAF dust is currently classified as EPA Hazardous Waste No. K061 (emission control dust/sludge from the primary production of steel in electric furnaces) and, accordingly, must be managed as a hazardous waste.

As a result of this determination, the assignee hereof has actively pursued various methods for managing EAF dust. The present invention is the result of this pursuit, and comprises a chemical stabilization process which renders the hazardous constituents in the dust virtually immobile. Such process is based on the pozzolanic reaction of materials containing anhydrous alumino-silicates which, in the presence of lime, water and chemicals, adsorb and/or physically entrap the heavy metals present in EAF dust into a calcium-alumino-silicate matrix, thereby rendering them essentially immobile. The process, and the results achieved thereby, will be described in greater detail in the specifications which follow.

SUMMARY OF THE INVENTION

The present invention is directed to a chemical stabilization process which in its preferred embodiment is adapted for electric arc furnace (EAF) dust whereby the hazardous constituents in the dust are rendered virtually immobile. The process is based on the pozzolanic reaction of materials containing anhydrous alumino-silicates which, in the presence of lime, water and chemicals, adsorb and/or physically entrap the heavy metals present in EAF dust into a calcium-alumino-silicate matrix.

In one of the several methods for chemical stabilization, the process includes mixing of the EAF dust with lime kiln dust, fly ash and hydrated lime to produce a blend having an available alkalinity of 9–9.5%. After dry mixing, an aqueous solution containing ferrous hydroxide and calcium sulfate, produced by mixing ferrous sulfate hepta-hydrate, calcium hydroxide and water, and adjusted to a pH of about 7, is added to the dry mix. Such mixture is then added to the mixing vessel and thoroughly mixed. The resulting blend, containing about one-third by weight of EAF dust, having been rendered non-hazardous, may be suitably transported to a disposal site.

BRIEF DESCRIPTION OF DRAWING

The FIGURE is a graphic representation of data demonstrating the advantages achieved by this invention to significantly reduce the EPTT leachable lead concentration of an EAF dust chemically stabilized by the practice of this invention.

DETAILED DESCRIPTION OF PREFERRED EMBODIMENT

The present invention is directed primarily to a chemical stabilization process for the treatment of hazardous waste, such as the dust generated by an electric arc furnace (EAF) process. This process is based on the pozzolanic reaction of materials containing anhydrous alumino-silicates which, in the presence of lime, water and chemicals, adsorb and/or physically entrap the heavy metals present in EAF dust into a calcium-alumino-silicate matrix, thereby rendering them essentially immobile. The reaction ultimately produces a relatively impermeable concrete-like solid waste.

To appreciate the contributions of this invention, it may be helpful to review the standards which have been developed under the direction of the U.S. Environmental Protection Agency (EPA). The EPA has determined that lead, cadmium and chromium are the constituents of concern for EAF dust, and has set the following maximum Extractive Procedure Toxicity Test (EPTT) leachate concentration limits for delisting a hazardous material, i.e. less than six times drinking water standard 6XDWS):

| EPA Six Times Drinking Water Standards (6 × DWS) | |
| --- | --- |
| Lead | 0.30 mg/l |
| Cadmium | 0.06 mg/l |
| Chromium | 0.30 mg/l |

Based on years of experience with the operation of an electric furnace shop, EPTT results for EAF dust, when untreated, are typically:

| | |
|---|---|
| Lead | 139 mg/l |
| Cadmium | 1.7 mg/l |
| Chromium | 0.9 mg/l |

Based on the EPA mandate to effectively manage the hazardous EAF dust, an extensive investigation was undertaken to develop a system to stabilize the hazardous waste and render it virtually immobile. The present invention is the result of such investigation. EPTT of EAF dust, when subjected to the chemical stabilization process of this invention, will exhibit a significantly reduced hazardous constituent level, before and after an extended cure time, on the order of:

| | |
|---|---|
| Lead | 0.02 mg/l |
| Cadmium | 0.02 mg/l |
| Chromium | 0.07 mg/l |

In this practice of this invention, the chemicals utilized herein include:
Fly ash, the major constituents being $SiO_2$ and $Al_2O_3$
Lime dust, the major constituent being CaO
Hydrated lime, the major constituent being $Ca(OH)_2$
Ferrous sulfate hepta-hydrate,
While the proportions of such chemicals may vary over a limited range, as set forth hereinafter, a relationship for practicing this process is one where, by approximate weight %, the ingredients include EAF dust (35), fly ash (6), lime kiln dust (15), ferrous sulfate hepta-hydrate (10), hydrated lime (6) and water (28).

Using such proportions, the process involves the following steps:

1. Mixing of EAF dust, lime kiln dust, fly ash and hydrated lime, for approximately 1 to 2 minutes. If necessary, the hydrated lime may be varied to insure a blend having an available alkalinity of between 9 and 9.5%.

2. Adding to said mixture an aqueous solution having a pH of about 7 and made from water, ferrous sulfate hepta-hydrate and calcium hydroxide.

3. Blending for approximately 10 minutes to yield a viscous paste-like material, which when cured with time, i.e., hours, produces an impermeable concrete-like solid waste. The hardening process may continue for a period of several weeks, or longer.

In the development of this invention, it was discovered that a key feature thereof was the presence of ferrous ions. Much of the earlier work was conducted using laboratory or pilot trials of ferrous sulfate hepta-hydrate, the preferred practice outlined above. However, the source of such ferrous ions need not be so clinically clean, but may, for example, be derived from such industrial sources as waste pickle liquor, a waste by-product in the steelmaking process. The suitability of such a source for the ferrous ions renders this invention particularly noteworthy. That is, this invention can make productive use of a waste by-product to render the constituents of a hazardous waste virtually immobile.

The FIGURE is a graphic illustration showing the unexpected advantages gained through the inclusion of ferrous ions in the practice of this invention. The FIGURE shows the effect of EP Toxicity leachate pH on Pb concentration of chemically stabilized EAF dust, both with and without ferrous ions. The upper curve represents data in which the ferrous ions were omitted from the aqueous solution. While a distinct advantage was achieved by controlling the pH thereof to a range of about 9 to 10, the concentration of Pb was significantly above that of material made with aqueous solution containing ferrous ions, as represented in the data of the lower curve.

Data, to be presented hereinafter, indicate that as little as 0.2%, by weight, of ferrous ions can be effective to reduce the lead concentration, as well as cadmium and chromium levels, to acceptable EPA standards.

To demonstrate the effectiveness of this process to detoxify EAF dust, twenty-one (21) randomly selected samples were tested. The results thereof, insofar as the hazardous elements cadmium, chromium and lead are concerned, are listed in TABLES I and II (before and after curing).

TABLE I

EP TOXICITY TESTS[1] for Cd, Cr, Pb
(before curing)

| Sample Identification | Constituent (mg/l) | | |
|---|---|---|---|
| | Cadmium | Chromium (Total) | Lead |
| A | <0.02 | <0.05 | <0.01 |
| B | <0.02 | <0.05 | 0.02 |
| C | <0.02 | <0.05 | 0.02 |
| D | <0.02 | <0.05 | 0.03 |
| E | <0.02 | <0.05 | 0.02 |
| F | <0.02 | <0.05 | <0.01 |
| G | <0.02 | <0.05 | 0.01 |
| H | <0.02 | <0.05 | <0.01 |
| I | <0.02 | <0.05 | 0.01 |
| J | <0.02 | <0.05 | 0.03 |
| K | <0.02 | <0.05 | 0.02 |
| L | <0.02 | <0.05 | 0.01 |
| M | <0.02 | <0.05 | 0.02 |
| N | 0.02 | <0.05 | 0.03 |
| O | <0.02 | 0.05 | 0.02 |
| P | <0.02 | <0.05 | <0.01 |
| Q | <0.02 | 0.12 | <0.01 |
| R | <0.02 | 0.16 | <0.01 |
| S | <0.02 | 0.13 | <0.01 |
| T | <0.02 | 0.13 | <0.01 |
| U | <0.02 | <0.05 | <0.01 |
| Average[2] | 0.02 | 0.07 | 0.02 |

[1]All EP Toxicity tests and resultant extract analyses were performed in accordance with procedures outlined under 40 CFR 261, Appendices II and III.
[2]Less than signs were omitted in computation of averages.

TABLE II

EP TOXICITY TESTS[1] for Cd, Cr, Pb
(after curing)

| Sample Identification | Constituent (mg/l) | | |
|---|---|---|---|
| | Cadmium | Chromium (Total) | Lead |
| A | <0.02 | <0.08 | 0.03 |
| B | 0.03 | <0.05 | 0.03 |
| C | <0.02 | <0.05 | 0.02 |
| D | <0.02 | <0.05 | 0.02 |
| E | 0.02 | <0.05 | 0.02 |
| F | <0.02 | <0.05 | <0.01 |
| G | <0.02 | 0.07 | 0.02 |
| H | 0.02 | <0.05 | 0.02 |
| I | 0.03 | <0.05 | <0.01 |
| J | <0.02 | 0.14 | <0.01 |
| | (0.03) | (0.07) | (0.03) |
| K | <0.02 | 0.17 | <0.01 |
| | (<0.02) | (0.05) | (0.02) |
| L | <0.02 | 0.07 | <0.01 |
| M | <0.02 | <0.16 | <0.01 |
| | (0.03) | (0.07) | (0.01) |
| N | 0.02 | 0.05 | <0.01 |

TABLE II-continued

EP TOXICITY TESTS[1] for Cd, Cr, Pb
(after curing)

| Sample Identification | Constituent (mg/l) | | |
|---|---|---|---|
| | Cadmium | Chromium (Total) | Lead |
| O | (<0.02)<br><0.02 | (0.06)<br>0.09 | (0.01)<br>0.01 |
| P | <0.02 | 0.06 | 0.03 |
| Q | (0.02)<br><0.02 | (0.05)<br>0.06 | (0.01)<br>0.04 |
| R | (0.02)<br><0.02 | (0.05)<br>0.05 | (0.02)<br>0.03 |
| S | <0.02 | 0.06 | 0.02 |
| T | <0.02 | 0.06 | 0.03 |
| U | <0.02 | 0.09 | 0.03 |
| Average[2] | 0.02 | 0.07 | 0.02 |

The results show no significant increase in the hazardous constituents concentration at the conclusion of the nine day test period.

While the foregoing represents a preferred embodiment, and the results to be achieved by this invention, variations in the proportions of the chemicals have been used to achieve comparable results. For example, in blending the EAF dust, lime kiln dust, fly ash and hydrated lime it is desirable to have an available alkalinity of between 9 and 9.5% CaO. However, tests have shown that effective results can be achieved with an available alkalinity of between about 6.9 and 11.5% CaO. A series of tests were conducted varying either the % of CaO of the dry blend or the pH of the ferrous ion solution. The results of such tests are reported in TABLE IV.

TABLE IV

VARIATION IN METHOD PARAMETERS

| Parameter | Sample | | | | | | | | | | | | | |
|---|---|---|---|---|---|---|---|---|---|---|---|---|---|---|
| | A' | B' | C' | D' | E' | F' | G' | H' | I' | J' | K' | L' | M' | N' |
| Dry Mix, % CaO | 7.9 | 9.0 | 10.0 | 6.9 | 7.9 | 9.0 | 6.6 | 10.8 | 7.0 | 11.5 | 7.0 | 7.0 | 10.9 | 10. |
| $Fe^{++}$ Soln. pH | 6.6 | 6.6 | 6.6 | 6.8 | 6.8 | 6.8 | 7.0 | 7.0 | 7.0 | 7.0 | 11.4 | 7.0 | 7.0 | 6.2 |
| EPTT Constituent (mg/l) | | | | | | | | | | | | | | |
| Pb | <.01 | <.01 | <.01 | .02 | <.01 | <.01 | .02 | <.01 | .04 | .02 | .03 | .05 | <.01 | <.01 |
| Cd | <.02 | <.02 | <.02 | .03 | <.02 | <.02 | .11 | <.02 | .20 | <.02 | .02 | .22 | <.02 | <.02 |
| Cr | <.05 | <.05 | <.05 | <.05 | <.05 | <.05 | <.05 | <.05 | <.05 | <.05 | <.05 | <.05 | <.05 | <.05 |
| EPTT pH | 8.3 | 8.8 | 9.6 | 7.9 | 8.2 | 8.4 | 7.6 | 10.5 | 7.7 | 10.9 | 7.8 | 7.5 | 10.3 | 9. |

Note:
Samples A' thru F' prepared using ferrous sulfate hepta-hydrate.
Samples G' thru N' prepared using waste pickle liquor for $Fe^{++}$ soln.

[1] All EP Toxicity tests and resultant extract analyses were performed in accordance with procedures outlined under 40 CFR 261, Appendices II and III. EP Toxicity tests for samples J, K, M, N, P and Q were done on separate portions of cured material ground to pass through 9.5 mm and 0.149 mm sieves. Results for portions passed through a 0.149 mm sieve are shown in parenthesis. All other results are for samples ground to pass through a 9.5 mm sieve.
[2] Less than signs were omitted in computation of averages.

In addition to, and in support of, the EP Toxicity tests reported in TABLES I and II, a multiple extraction procedure was performed on six (6) samples to quantify the long term leaching characteristic of EAF dust chemically stabilized by the process of this invention. The multiple extraction procedure used was based on a procedure submitted to the U.S. EPA by Stablex Corporation and cited in the *Federal Register* Notice of Nov. 22, 1982, page 52687. The results are reported in TABLE III.

Thus, in addition to the latitude in selecting the % CaO of the dry mix, the process offers some flexibility in the range of pH for the ferrous ion solution. Specifically, a pH between about 6.2 to 11.4 is suitable in the practice of this invention. However, a preferred aim is a pH of 7. As a consequence, the pH of the EP toxicity test leachate can vary between about 7.8 to 10.9 to achieve constituent levels which are still less than 6XDWS.

The variations in the respective pH levels is clearly dependent upon the respective quantities and sources of ingredients which comprise the additives for practicing the process of this invention. A further series of tests were conducted to vary such additives. The results thereof are reported in TABLE V.

TABLE III

MULTIPLE EXTRACTION PROCEDURE FOR Cd, Cr, Pb
(after curing, day 1 and day 9)

| Constituent (mg/l) | Sample | | | | | | | | | | | |
|---|---|---|---|---|---|---|---|---|---|---|---|---|
| | A | | B | | D | | E | | G | | H | |
| | Day 1 | Day 9 | Day 1 | Day 9 | Day 1 | Day 9 | Day 1 | Day 9 | Day 1 | Day 9 | Day 1 | Day 9 |
| Cadmium | <0.02 | <0.02 | <0.02 | <0.02 | <0.02 | <0.02 | <0.02 | <0.02 | <0.02 | <0.02 | <0.02 | <0.02 |
| Chromium | 0.08 | <0.05 | <0.05 | <0.05 | <0.05 | <0.05 | <0.05 | <0.05 | <0.05 | <0.05 | <0.05 | <0.05 |
| Lead | 0.01 | 0.02 | 0.01 | 0.01 | 0.01 | 0.01 | 0.01 | 0.02 | 0.01 | 0.01 | 0.01 | 0.01 |

TABLE V

VARIATION IN ADDITIVE QUANTITY

| Additive (gm) | Sample | | | | | | | | |
|---|---|---|---|---|---|---|---|---|---|
| | P' | Q' | R' | S' | T' | U' | V' | W' | X' |
| EAF dust | 550 | 550 | 550 | 550 | 550 | 550 | 550 | 550 | 550 |
| Lime kiln dust | 350 | 350 | 400 | 350 | 200 | 250 | 300 | 300 | 250 |

TABLE V-continued

VARIATION IN ADDITIVE QUANTITY

| Sample | P' | Q' | R' | S' | T' | U' | V' | W' | X' |
|---|---|---|---|---|---|---|---|---|---|
| Fly ash | 210 | 210 | 150 | 165 | 175 | 165 | 175 | 175 | 175 |
| Hydrated lime | 25 | 25 | 100 | 65 | 140 | 55 | 35 | 40 | 200 |
| $Fe_2SO_4 \cdot 7H_2O$ | — | 50 | 180 | — | 165 | — | 12 | 25 | 300 |
| $H_2O$ | 240 | 300 | 450 | 350 | 500 | 300 | 285 | 300 | 550 |
| EPTT Constituent (mg/l) | | | | | | | | | |
| Pb | 1.2 | .03 | <.01 | .40 | .01 | .19 | .03 | <.01 | <.01 |
| Cd | <.02 | <.02 | <.02 | .08 | <.02 | <.02 | <.02 | <.02 | <.02 |
| Cr | 1.4 | <.05 | <.05 | .11 | <.05 | .23 | .08 | .05 | <.05 |
| EPTT pH | 11.0 | 9.5 | 10.0 | 8.0 | 7.8 | 10.7 | 8.8 | 9.3 | 8.9 |

Water is added for consistency to insure flowability of the mixture. One skilled in the art could readily determine that quantity of water to be added to the mixture. Since mixing may be automatic, or even manual, one can easily determine the amount of water needed to achieve a thorough but flowable mixture for the manner and total quantity to be mixed. From TABLE V, the percentage of water varied between about 17.5% (Sample P') to about 28.9% (Sample T').

While Samples Q', R', T', V', W' and X' represent samples from practices within the scope of this invention, particular attention is drawn to the comparison of Samples U', V' and W'. In U', without the addition of ferrous ions, the constituent levels for Pb and Cr were well above the levels to be achieved by the chemical stabilization process of this invention even though these levels may be less than the required 6XDWS for delisting. In V', with the addition of less than 1% by weight ferrous ions, the levels of Pb and Cr were significantly reduced. In W', by doubling the amount of ferrous ions, Pb and Cr levels were further reduced.

While the presence of ferrous ions has a clear demonstrated impact on the successful practice of this invention, there is an obvious leveling off as the quantity increases. For example, in X', the weight % of ferrous ions was about 3.0. However, the constituent levels for Pb, Cd and Cr varied very little from W'. Accordingly, the upper limit for the ferrous ions is dictated more by economics and effects on pH, rather than results.

All of the above test samples listed in TABLE V were prepared on the basis of first combining the dry materials, i.e. EAF dust, lime kiln dust, fly ash, hydrated lime and ferrous sulfate hepta hydrate followed by mixing with water for consistency. However, based on experience and knowledge in selecting the various constituents, it is possible to mix all desired constituents in a single batch mixing operation.

Finally, the efficiency of the process, from the dual standpoint of controlling toxicity and cost of operations, dictates that as much EAF dust be treated as practical. It has been shown that the EAF dust may comprise approximately 65% by weight.

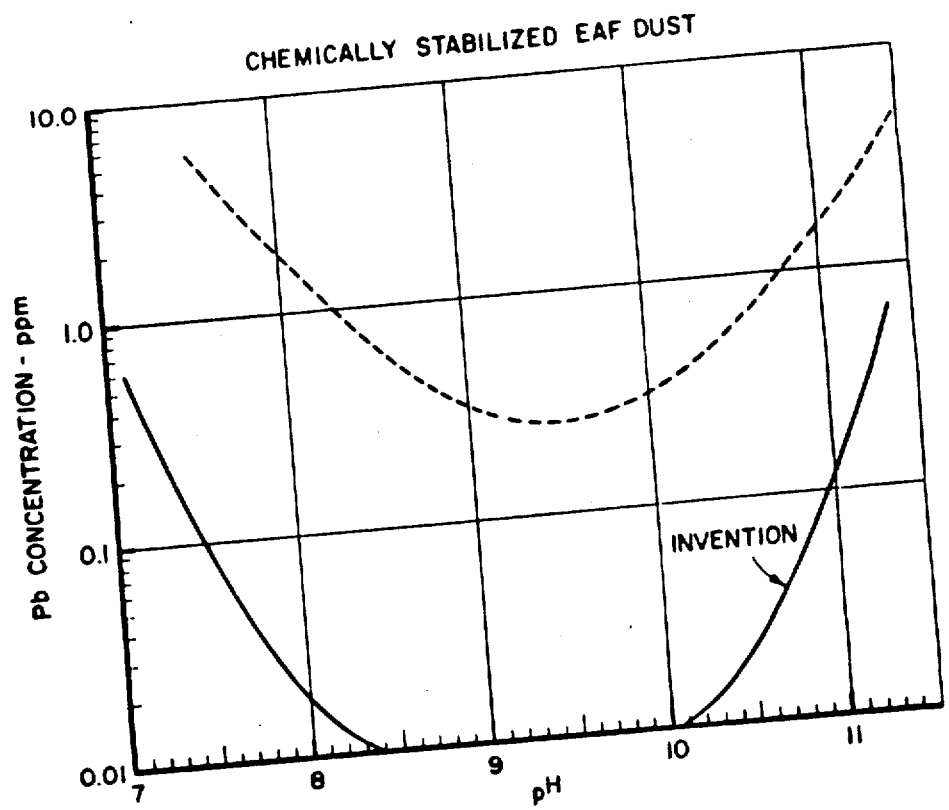

We claim:

1. A method of chemically stabilizing waste material selected from the group consisting of electric arc furnace dust, lime kiln dust and fly ash, where such material contains heavy metals and may be classified as hazardous waste, comprising the steps of
    (1) mixing said waste material with an effective amount of lime, waste pickle liquor and water to yield a flowable blend,
    (2) allowing said blend to set to produce a relatively impermeable concrete-like solid waste in which said heavy metals are physically entrapped or adsorbed therein.

2. The method of chemically stabilizing hazardous waste according to claim 1, wherein the waste to be treated is the dust by-product of the emissions from an electric arc furnace and said heavy metals are selected from the group consisting of lead, cadmium, and chromium.

3. The method of chemically stabilizing hazardous waste according to claim 2, wherein said lead, cadmium and chromium exhibit a reduced hazardous constituent level not to exceed

| Lead | 0.30 mg/l; |
|---|---|
| Cadmium | 0.06 mg/l; |
| Chromium | 0.30 mg/l. |

4. The method of chemically stabilizing hazardous waste according to claim 1, wherein the quantity of the waste material does not exceed about 65% by weight of said blend.

5. The method of chemically stabilizing hazardous waste according to claim 1 wherein said waste material contains a member selected from the group consisting of blast furnace slag and other pozzolanic materials, and wherein said lime is derived from lime products.

6. A method of chemically stabilizing waste material selected from the group consisting of electric arc dust, lime kiln dust and fly ash where such material contains heavy metals and may be classified as hazardous waste, comprising the steps of
    (1) mixing said waste material with lime to yield a mixture having an available alkalinity of between about 6.9 and 11.5,
    (2) adding thereto waste pickle liquor in an amount sufficient for immobilizing said heavy metals,
    (3) adjusting the consistency of said blend by the addition of water to yield a flowable mass, and
    (4) allowing said mass to set to produce a relatively impermeable concrete-like solid waste in which said heavy metals are encapsulated or adsorbed therein.

7. The method of chemically stabilizing hazardous waste according to claim 6 wherein said waste material contains a member selected from the group consisting of blast furnace slag and other pozzolanic materials, and wherein said lime is derived from lime products.

8. The method of chemically stabilizing hazardous waste according to claim 6, wherein the quantiy of the waste material does not exceed about 65% by weight of the flowable mass.

9. A method of chemically stabilizing waste material selected from the group consisting of dusts and sludges, where such material contains heavy metals and may be classified as hazardous waste, comprising the steps of
 (1) preparing a solution of waste pickle liquor having a pH between about 6.2 to 11.4,
 (2) adding to said solution a quantity of said material, fly ash and lime,
 (3) thoroughly blending the ingredients to form a flowable mass, and
 (4) allowing said mass to set to produce a relatively impermeable concrete-like solid waste in which said heavy metals are physically entrapped or adsorbed therein.

10. The method of chemically stabilizing hazardous waste according to claim 9, wherein said lead, cadmium and chromium exhibit a reduced hazardous constituent level not to exceed

| | |
|---|---|
| Lead | 0.30 mg/l; |
| Cadmium | 0.06 mg/l; |
| Chromium | 0.30 mg/l. |

* * * * *

UNITED STATES PATENT AND TRADEMARK OFFICE
CERTIFICATE OF CORRECTION

PATENT NO. : 4,840,671

DATED : June 20, 1989

INVENTOR(S) : John D. Lynn, et al

Page 1 of 2

It is certified that error appears in the above-identified patent and that said Letters Patent is hereby corrected as shown below:

The following figure should be added.

(as shown on the attached sheet)

Signed and Sealed this

Fourteenth Day of May, 1991

*Attest:*

*Attesting Officer*

HARRY F. MANBECK, JR.

*Commissioner of Patents and Trademarks*

UNITED STATES PATENT AND TRADEMARK OFFICE
CERTIFICATE OF CORRECTION

PATENT NO. : 4,840,671

DATED : June 20, 1989

INVENTOR(S) : John D. Lynn, et al

It is certified that error appears in the above-identified patent and that said Letters Patent is hereby corrected as shown below: